United States Patent
Mardirossian

Patent Number: 6,152,611
Date of Patent: Nov. 28, 2000

[54] METHOD AND APPARATUS FOR PROVIDING A FLEXIBLE SPLINT SPLICE

[75] Inventor: Hovhannes Habib Mardirossian, Morris Plains, N.J.

[73] Assignee: Tyco Submarine Systems Ltd., Morristown, N.J.

[21] Appl. No.: 09/131,382

[22] Filed: Aug. 7, 1998

[51] Int. Cl.[7] .................................................. G02B 6/255
[52] U.S. Cl. .............................................. 385/99; 385/147
[58] Field of Search ................................. 385/95–99, 147

[56] References Cited

U.S. PATENT DOCUMENTS

| | | | |
|---|---|---|---|
| 4,923,268 | 5/1990 | Xu | 385/96 |
| 5,076,657 | 12/1991 | Toya et al. | 385/96 |
| 5,257,337 | 10/1993 | Grigsby et al. | 385/96 |
| 5,309,536 | 5/1994 | Suganuma et al. | 385/96 |
| 5,731,051 | 3/1998 | Fahey et al. | 428/34.9 |

OTHER PUBLICATIONS

Mechanical Fusion Splice Protection Cover, 1 pg. (No date).
Spliced Fiber Protection System, p. S–22. (No date).

*Primary Examiner*—Akm E. Ullah

[57] ABSTRACT

A system and method are introduced to provide a flexible splint for an optical-fiber splice. After splicing the fiber, it is placed within a flexible inner layer. Over the flexible inner layer is placed a flexible outer layer, thereby creating an inner- and outer-layer splint.

6 Claims, 4 Drawing Sheets

METHOD AND APPARATUS FOR PROVIDING A FLEXIBLE SPLINT SPLICE

FIELD OF THE INVENTION

The present invention relates to properties of optical fibers. More particularly, the present invention relates to flexible splices of optical fibers.

BACKGROUND OF THE INVENTION

Often, one needs to physically connect separate pieces of optical fiber to create a complete optical path for a signal. To do this, the separate fibers are connected by a splice. There are various ways to splice optical fibers. One way of splicing uses an arc-fusion technique. This technique entails stripping approximately 1.5 cm of the jacket from an optical fiber. The stripping step can be performed using an acid or heat-stripping process. The fiber is then cleaved with a fiber cleaver to approximately 0.5 cm, and cleaned in an ultrasonic cleaner. Finally, the fiber is placed in fiber-splicer chucks for alignment and fusing. The arc fusion technique melts the tips of the two fibers together.

Typical problems with splices include signal loss across the splice, environmental degradation of the bare optical fiber, and physical weakness at the splice point. Signal loss can arise from a number of causes, including mismatch between the profiles of the fibers at the joint, misalignment of the fiber cores due to core concentricity error, poor mechanical alignment due to lateral offset, separation, or tilt, and core deformation due to the fusion technique employed.

Environmental degradation of optical fiber can occur when unjacketed fiber is exposed to air, as might happen when protective jackets of unattached fibers are stripped prior to fusing. The fiber degradation reduces the period of time for which the fiber operates at the expected performance level.

Additionally, the splice point is considered a weak point along the fiber, making the fiber at this point more susceptible to cracking or breaking if handled the way one would handle a non-spliced fiber. Specifically, spliced fibers typically cannot be bent in the same way or to the same degree as non-spliced fibers because the stress from bending at the splice point can sever the fiber segments at the splice.

To alleviate the problems associated with splicing, it is known in the art to place a rigid splint around the optical fiber at the splice point. The rigid splint protects the optical fiber against environmental degradation by creating a relatively snug covering over the fiber. Additionally, the rigid splice protects the optical fiber against bending at the splice point, thereby protecting the splice point against mishandling.

There are several examples of rigid splints known in the art. One example of a rigid splint is made by Fujikura, and is called the PF-3 Splice Protection Sleeve. This sleeve has a three-part design, including a hot-melt type adhesive inner tube and a rigid reinforcement member enclosed in a cross-linked polyethylene heat shrinkable outer tube. Another such example of a rigid splint is the butterfly plastic ULTRAsleeve splint. The ULTRAsleeve is manufactured by using an acrylic foam closed cell tape to seal against chemical and environmental conditions for long-term applications. The rigid plastic housing consists of two halves that fold along a hinge (similar to a door hinge). The splice is placed inside the plastic housing; the locks on the sleeve keep the rigid protection cover from opening, and compresses the acrylic foam to provide a hermetic seal.

Unfortunately, these rigid splints create problems, inter alia, with handling the spliced optical fibers. For example, when creating circuits, it is very difficult, if not impossible, to place a spliced wire into an optical tray that has many curves. If one desires to place the fiber in such a tray, or if one desires to spool the wire, one must guess the proper length of the fiber so as to position the splice in a predetermined straight-line storage area on a fiber-optic tray.

Another problem with a rigid splint is that, because they must hug closely the exposed fiber to prevent environmental damage, they often physically damage the fiber when they are applied. For example, when one applies the butterfly plastic ULTRAsleeve splint, one can damage the fiber when the splint is mechanically crimped into place around the splice.

Additionally, rigid splints can damage a fiber at the point the fiber exits the splint. If a fiber bends at the point where it leaves the splint, it is possible to either kink the fiber, thereby increasing physical strain and degrading signal transmission, or bend the fiber to the point where it breaks.

Historically, neither the need nor the knowledge existed for creating strong flexible splices. With the recent explosion in the use of optical communications, however, particularly with regard to circuit design, a growing need exists for both strength and flexibility with regard to an optical fiber splice without significant signal loss.

SUMMARY OF THE INVENTION

To alleviate the problems inherent in the prior art, a system and method are introduced to provide a strong, flexible splint that contributes negligible optical signal loss.

In one embodiment of the present invention, the unconnected ends of two optical fibers are spliced together. Then, the spliced fiber ends are encased within a flexible inner layer, and over this flexible inner layer, a flexible outer layer is placed, thereby creating a splint. A shape-retention member may be placed between the flexible inner layer and the flexible outer layer.

DETAILED DESCRIPTION

The present invention relates to a system and method for providing a flexible splint for optical-fiber splices.

Figure 1:
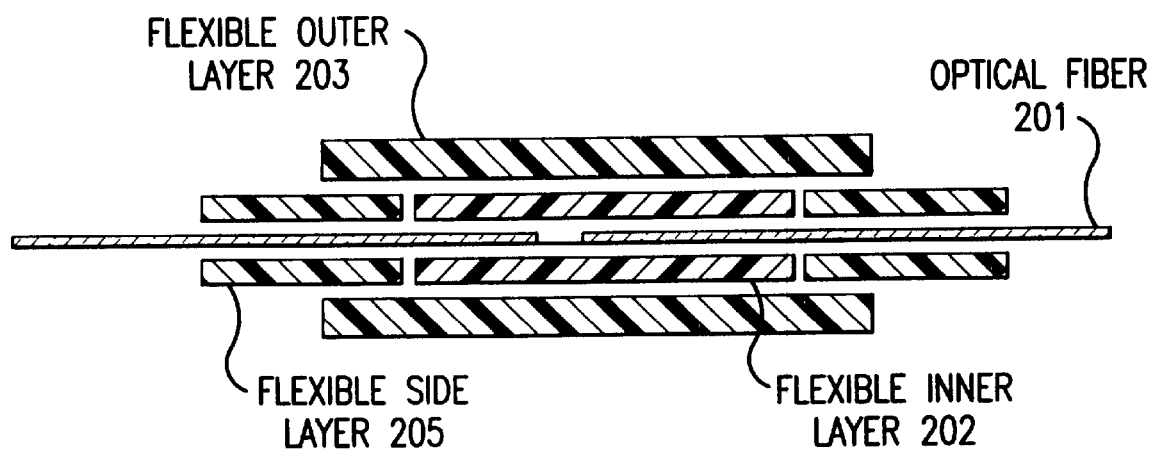
FIG. 1 is a diagram of an apparatus according to one embodiment of the present invention.
Figure 2:
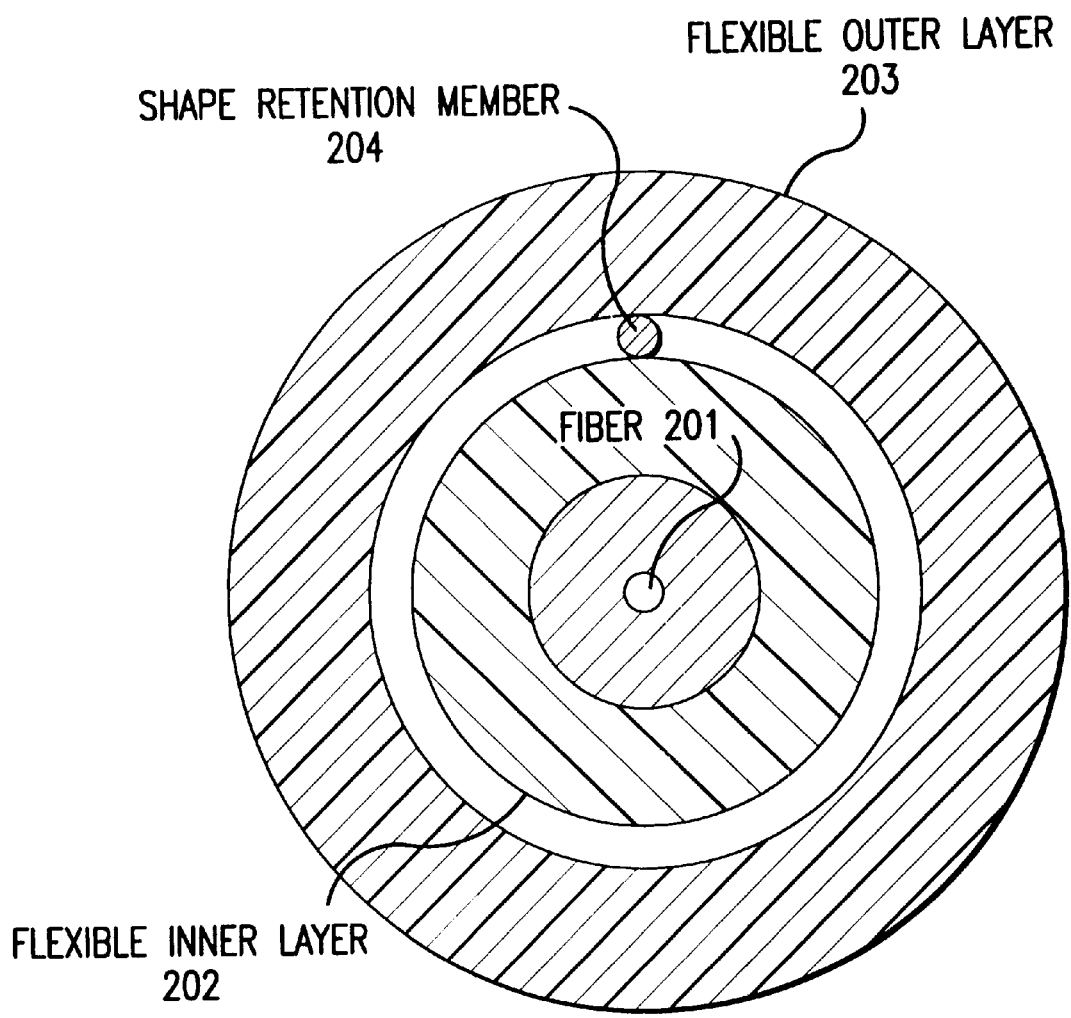
FIG. 2 is a diagram of an apparatus according to one embodiment of the present invention.

Turning now in detail to the drawings, FIG. 1 illustrates an exposed side view of an embodiment of the application, and FIG. 2 illustrates a cross section of an embodiment of the present invention. For the sake of clarity, the same reference numbers will be used to refer to the same elements throughout the drawings.

In FIGS. 1 and 2, fiber 201 is a spliced fiber. This spliced fiber has no jacket in the region around the splice and so is, without more, exposed to air. Over this splice is placed flexible inner layer 202 and flexible outer layer 203. These two layers form a splint over the splice.

The purpose of flexible inner layer 202 is to provide some amount of strength against bending and to protect the exposed fiber from environmental damage while remaining flexible. Flexible inner layer 202 should cover the entire exposed portion of the optical fiber and should adhere to the exposed fiber in such a way as to minimize the amount of air around the fiber. Typically, flexible inner layer 202 will extend outward from the exposed portion to cover several inches of the jacketed portion of the optical fiber, but can extend outward from the exposed portion any arbitrary length. An example, although not the only example, of a material for flexible inner layer 202 is hot melt glue made by 3M corporation. As the glue is melted, it forms around the fiber, adhering to the fiber and keeping it protected from environmental damage.

Flexible outer layer 203 adds strength to the splice so that when optical fiber 201 is bent, the splice resists separating Flexible outer layer 203 should cover enough of optical fiber 201 around the splice to allow fiber 201 to be bent as needed. Typically, flexible outer layer 203 will extend several inches beyond the end of flexible inner layer 202, and can extend outward any arbitrary length. An example, although not the only example, of a material for flexible outer layer 203 is FP-301 Polyolefin 3M heat shrink tubing.

In one embodiment of the present invention, shape-retention member 204 is used with the splint to allow the splinted fiber to retain a bent shape. Shape-retention member 204 stiffens the splint somewhat, but primarily allows the fiber to retain a bent shape after the area around the splice is bent into some non-linear shape. Shape-retention member 204 can be any material and shape that allows the fiber to be bent while withstanding the splint's tendency to return to a substantially linear shape. If 3M hot-melt glue is used as flexible inner layer 202, and FP-301 Polyolefin 3M heat-shrink tubing is used as an flexible outer layer 203, then 24 gauge copper wire with nickel plating is an appropriate shape-retention member. Other types of shape-retention members are possible, as long as they satisfy the criteria of retaining the splint in a desired shape. In one embodiment of the invention, the shape-retention member is placed between flexible inner layer 202 and flexible outer 203.

In one embodiment of the present invention, flexible side layer 205 is used. Flexible side layer 205 is disposed between a portion of fiber 201 and a portion of flexible outer layer 203, extending outward beyond the end of flexible outer layer 203, and serves primarily to reduce the strain on fiber 201 at the point fiber 201 exits from within flexible outer layer 203. If only flexible outer layer 203 is used, there can be a relatively large gap between optical fiber 201 and flexible outer layer 203. This is not always the case, and is dependent on the materials used. If there is a gap, however, fiber 201 may bend as it exits from under flexible outer layer 203, causing fiber 201 to press against the exit point putting strain on fiber 201. Therefore, flexible side layer 205 preferably is smaller in diameter than flexible outer layer 203. Flexible side layer 205 can be made of the same material as flexible outer layer 203.

Figure 3:
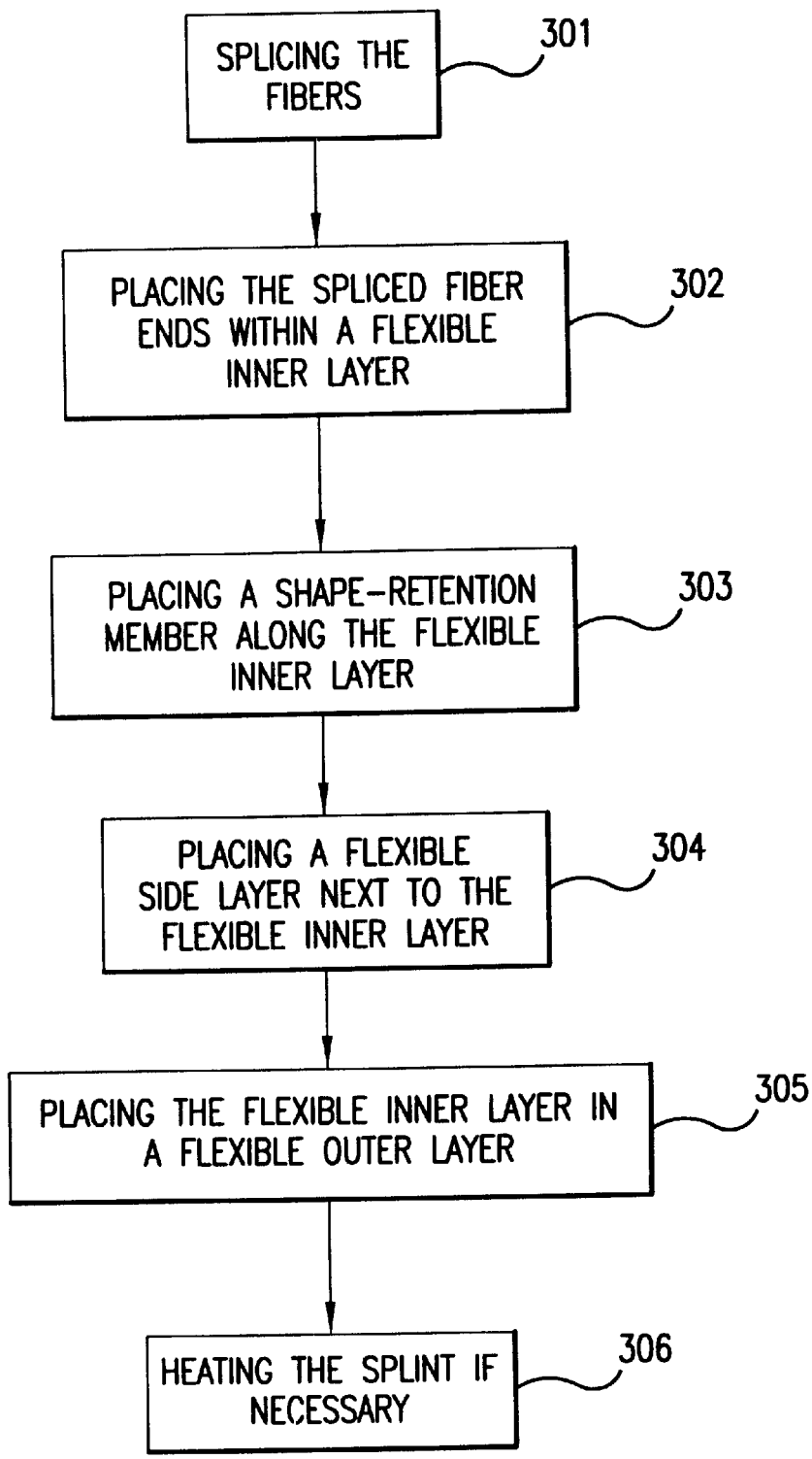
FIG. 3 is a flow chart illustrating an embodiment of a method according to the present invention.

FIG. 3 is a flow chart of a method according to an embodiment of the present invention. At step 301, the initially separate fibers are spliced to create fiber 201. The fibers can be spliced in any way known in the art (e.g., an arc-fusion splice). After the splice, typically some amount of fiber around the splice will be exposed to the environment; that is, the coating will be removed from the fiber. At step 302, at least this amount of exposed fiber is encased in flexible inner layer 202. Flexible inner layer 202 adds some strength to the splice, and also grips the area around the exposed fiber in such a way as to minimize environmental damage. In one embodiment of the present invention, flexible inner layer 202 actually melts around optical fiber, leaving no fiber exposed to the environment. Flexible inner layer 202 should cover the entire exposed portion of the optical fiber. Typically, flexible inner layer 202 will extend outward from the exposed portion to cover several inches of the jacketed portion of the optical fiber, but can extend outward from the exposed portion any arbitrary length. One example of material used for making flexible inner layer 202 is hot melt glue made by 3M corporation.

In one embodiment of the present invention, at step 303, shape-retention member 204 is placed across the spliced area on top of flexible inner layer 202. This shape-retention member stiffens the splint somewhat, but primarily allows the fiber to retain a bent shape after the spliced region is bent into some non-linear shape. Shape-retention member 204 does not have to be directly adjacent to flexible inner layer 202. For example, but not the only example, shape-retention member 204 can be placed inside or outside flexible outer layer 203.

Shape-retention member 204 can be any material and shape that allows fiber 201 to be bent while withstanding the splint's tendency to return to a substantially linear shape. If 3M hot-melt glue is used as flexible inner layer 202, and FP-301 Polyolefin 3M heat-shrink tubing is used as flexible outer layer 203, then a possible shape-retention member is a 24 gauge copper wire with nickel plating. Other types of shape-retention members are possible, as long as they satisfy the criteria of retaining the splint in a desired shape.

In another embodiment of the present invention, flexible side layer 205 is placed next to flexible inner layer 202 at step 304. Flexible side layer 205 is placed under flexible outer layer 203 and serves primarily to reduce the strain on fiber 201 at the point fiber 201 exits from within flexible outer layer 203. If only flexible outer layer 203 is used, there can be a relatively large gap between the optical fiber and flexible outer layer 203. This is not always the case, and is dependent on the materials used. If there is a gap, however, the fiber may bend as it exits from under flexible outer layer 203, causing it to press against the exit point, and thereby putting strain on the fiber. Therefore, flexible side layer 205 preferably is smaller in diameter than flexible outer layer 203. In one embodiment, flexible side layer 205 is made from the same material as flexible outer layer 203.

If 3M hot melt is used as flexible inner layer 202, and FP-301 Polyolefin 3M heat-shrink tubing is used as flexible outer layer 203 (and possibly as flexible side layer 204, if a side layer is used), then at step 206, the splint is heated, thereby melting the glue and shrinking the tubing.

At step 305, flexible inner layer 202 is placed in flexible outer layer 203. Flexible outer layer 203 adds strength to the splice so that when the optical fiber is bent, the splice resists separating. Flexible outer layer 203 should cover enough of the optical fiber around the splice to allow the fiber to be bent as needed. Typically, flexible outer layer 203 will extend several inches beyond the end of flexible inner layer, and can extend outward any arbitrary length. One example of material used for making flexible outer layer 203 is FP-301 Polyolefin 3M heat shrink tubing.

When practicing various embodiments of the present invention, steps 303 and 304 are optional, and in some variations one or the other or both steps are excluded.

Figure 4:
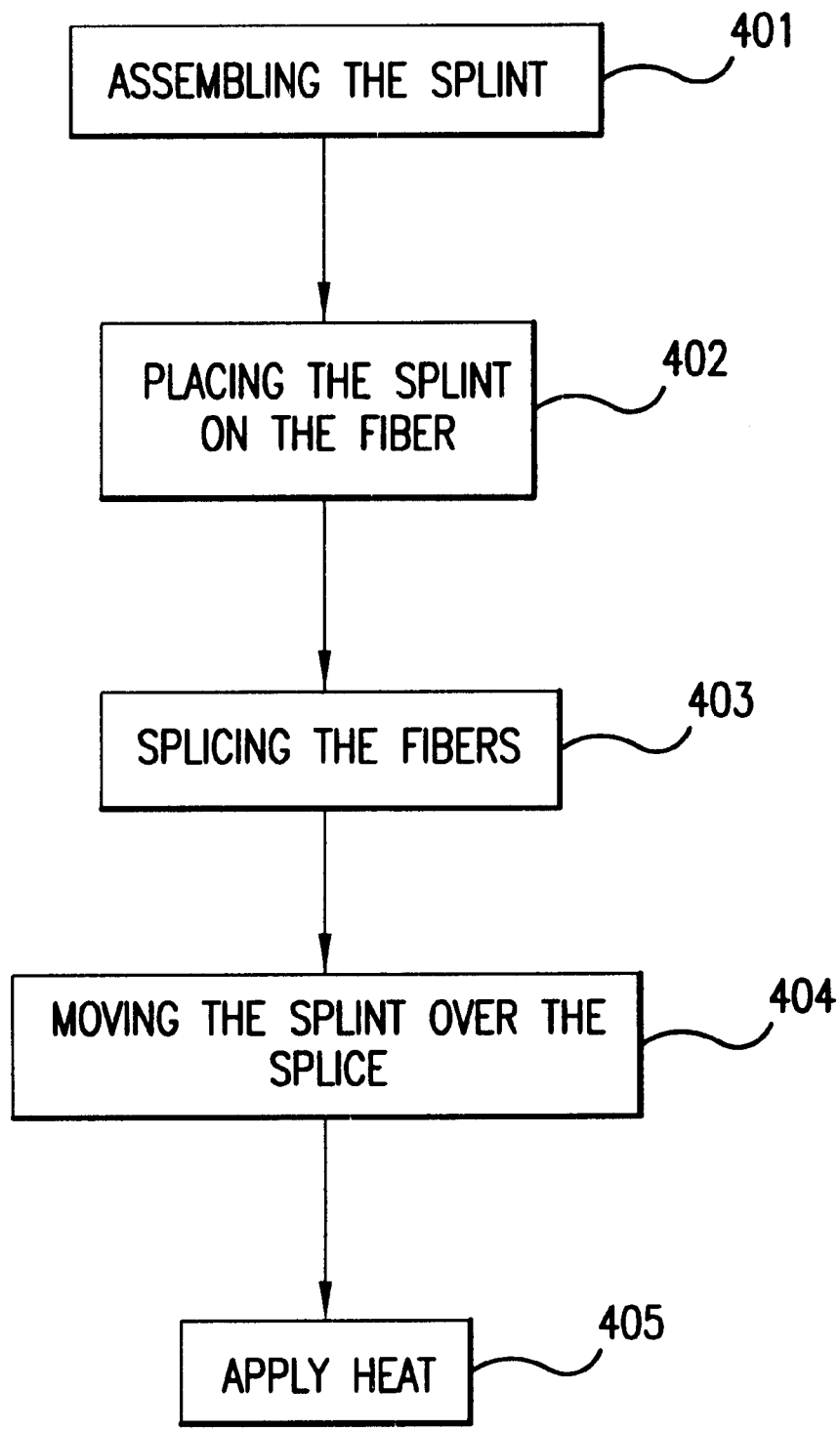
FIG. 4 is a flow chart illustrating another embodiment of a method according to the present invention.

FIG. 4 is a flow chart of another embodiment of the present invention. In this embodiment, at step 401, the splint (substantially as described above) is assembled and then placed over the fiber to be spliced at step 402. The fibers are then spliced at step 403, and the splint is moved over the spliced area at step 404. At step 405, if necessary, heat is applied to the splint.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A method of protecting an optical-fiber splice, comprising:

encasing the optical-fiber splice within a flexible inner layer;

encasing the inner layer within a flexible outer layer; and positioning, between said flexible inner layer and said flexible outer layer, a non-grid shape-retention member.

2. The method of claim 1, further comprising:

(c) placing around the optical-fiber splice, at an end of the flexible inner layer, and underneath the flexible outer layer, a flexible side layer.

3. The method of claim 1, wherein the flexible inner layer comprises hot melt glue, and wherein the flexible outer layer comprises heat-shrink tubing, and further comprising:

(c) heating the splint.

4. An optical-fiber apparatus comprising:

flexible inner layer surrounding an optical-fiber splice;

a flexible outer layer placed over the flexible inner layer; and a non-rigid shape retention member disposed between said inner and outer layer.

5. The optical-fiber apparatus of claim 4, further comprising:

(d) a flexible side layer placed at an end of the flexible inner layer.

6. The optical-fiber apparatus of claim 4, further comprising:

(e) a flexible side layer placed at an end of the flexible inner layer.

* * * * *

UNITED STATES PATENT AND TRADEMARK OFFICE
CERTIFICATE OF CORRECTION

PATENT NO. : 6,152,611
DATED : November 28, 2000
INVENTOR(S) : Havannes Habib Mardirossian, Wali Shah Page 1 of 1

It is certified that error appears in the above-identified patent and that said Letters Patent is hereby corrected as shown below:

<u>Title page,</u>
Item [75], Essex, N.J., please add as an inventor -- Wali Shah --

Signed and Sealed this

Twenty-third Day of October, 2001

Attest:

*Nicholas P. Godici*

*Attesting Officer*

NICHOLAS P. GODICI
*Acting Director of the United States Patent and Trademark Office*